United States Patent
Wang et al.

(10) Patent No.: US 11,215,716 B2
(45) Date of Patent: Jan. 4, 2022

(54) PHOTO-DETECTING CIRCUIT, DRIVING METHOD THEREOF AND FLAT PANEL DETECTOR

(71) Applicants: Beijing BOE Optoelectronics Technology Co., Ltd., Beijing (CN); BOE TECHNOLOGY GROUP CO., LTD., Beijing (CN)

(72) Inventors: Zhiyong Wang, Beijing (CN); Shuai Xu, Beijing (CN); Yong Song, Beijing (CN); Lei Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 275 days.

(21) Appl. No.: 16/497,287

(22) PCT Filed: Apr. 15, 2019

(86) PCT No.: PCT/CN2019/082627
§ 371 (c)(1),
(2) Date: Sep. 24, 2019

(87) PCT Pub. No.: WO2019/214400
PCT Pub. Date: Nov. 14, 2019

(65) Prior Publication Data
US 2021/0333419 A1 Oct. 28, 2021

(30) Foreign Application Priority Data
May 9, 2018 (CN) .......................... 201810439589.3

(51) Int. Cl.
*G01T 1/24* (2006.01)

(52) U.S. Cl.
CPC .................................. *G01T 1/247* (2013.01)

(58) Field of Classification Search
CPC ....................................................... G01T 1/247
See application file for complete search history.

(56) References Cited

U.S. PATENT DOCUMENTS

| 5,869,857 A | 2/1999 | Chen |
| 5,920,345 A * | 7/1999 | Sauer ................... H04N 5/3575 |
| | | 348/308 |

(Continued)

FOREIGN PATENT DOCUMENTS

| CN | 1193174 A | 9/1998 |
| CN | 101604972 A | 12/2009 |

(Continued)

OTHER PUBLICATIONS

First Office Action and English language translation, CN Application No. 201810439589.3, dated Feb. 27, 2020, 15 pp.

*Primary Examiner* — Blake C Riddick
(74) *Attorney, Agent, or Firm* — Myers Bigel, P.A.

(57) ABSTRACT

A photo-detecting circuit including a photosensitive detector configured to accumulate photo-generated charges at a first node upon irradiation by light, a transfer circuit configured to establish a current path to the first node in response to a first scan signal being active, an integrating circuit configured to selectively operate in a first mode in which the integrating circuit operates as an integrator to integrate a photocurrent and transfer an integration result to a second node for readout or a second mode in which the first input terminal of the integrating circuit is in conduction with the second node, and a reset circuit configured to selectively supply a first voltage or a second voltage to the second input terminal of the integrating circuit as a reference voltage. The second voltage is greater than the first voltage.

20 Claims, 3 Drawing Sheets

(56) References Cited

U.S. PATENT DOCUMENTS

| | | | |
|---|---|---|---|
| 6,504,222 B1* | 1/2003 | Miyamoto | B82Y 20/00 250/338.1 |
| 7,791,664 B1* | 9/2010 | Koifman | H04N 5/37457 348/308 |
| 9,264,643 B1 | 2/2016 | Xue | |
| 2005/0225683 A1* | 10/2005 | Nozawa | G09G 3/3233 348/801 |
| 2009/0152664 A1* | 6/2009 | Klem | H01L 27/14641 257/440 |
| 2009/0278028 A1* | 11/2009 | Yonemaru | G01J 1/46 250/200 |
| 2009/0303172 A1 | 12/2009 | Park et al. | |
| 2009/0322719 A1 | 12/2009 | Okada | |
| 2010/0079632 A1* | 4/2010 | Walschap | H04N 5/3575 348/294 |
| 2011/0309236 A1* | 12/2011 | Tian | H01L 27/14687 250/208.1 |
| 2013/0044250 A1 | 2/2013 | Senda et al. | |
| 2013/0093927 A1 | 4/2013 | Yamada | |
| 2013/0100327 A1 | 4/2013 | Senda et al. | |
| 2013/0134298 A1* | 5/2013 | Maltere | G01J 1/18 250/214.1 |
| 2014/0253073 A1* | 9/2014 | Moon | H02M 3/1588 323/281 |
| 2015/0281613 A1 | 10/2015 | Vogelsang et al. | |
| 2016/0028985 A1 | 1/2016 | Vogelsang et al. | |
| 2018/0033815 A1* | 2/2018 | Chalmers, Jr. | G01J 1/44 |
| 2018/0190177 A1 | 7/2018 | Hung et al. | |
| 2018/0247968 A1* | 8/2018 | Na | G01S 7/4914 |
| 2018/0270433 A1* | 9/2018 | Ota | G01T 1/2018 |
| 2019/0355782 A1* | 11/2019 | Do | H01L 27/14643 |

FOREIGN PATENT DOCUMENTS

| | | |
|---|---|---|
| CN | 102957881 A | 3/2013 |
| CN | 103067666 A | 4/2013 |
| CN | 103067670 A | 4/2013 |
| CN | 104704812 A | 6/2015 |
| CN | 105144699 A | 12/2015 |
| CN | 105741754 A | 7/2016 |
| CN | 108680587 A | 10/2018 |
| JP | 11-187471 A | 7/1999 |
| KR | 10-0928700 B1 | 11/2009 |

* cited by examiner

PHOTO-DETECTING CIRCUIT, DRIVING METHOD THEREOF AND FLAT PANEL DETECTOR

CROSS-REFERENCE TO RELATED APPLICATIONS

The present application is a 35 U.S.C. 371 national stage application of PCT International Application No. PCT/CN2019/082627, filed on Apr. 15, 2019, which claims priority to Chinese Patent Application No. 201810439589.3, filed on May 9, 2018, the entire disclosure of which is incorporated herein by reference.

TECHNICAL FIELD

The present disclosure relates to the field of signal detection technologies, and in particular, to a photo-detecting circuit, a flat panel detector, and a method of driving the photo-detecting circuit.

BACKGROUND

Digital radiography (DR) is an X-ray photography technology developed in the 1990s. It has the advantages of fast imaging speed, convenient operation and high imaging resolution. A key component for the DR technology is the flat panel detector with which images are acquired. The flat panel detector typically includes an X-ray conversion layer (e.g., a scintillation crystal coating), a photodiode, etc., wherein the X-ray conversion layer converts X-rays into an optical signal after being exposed to the X-rays, and the photodiode converts the optical signal into an electrical signal. The electrical signal is read and sent to a computer image processing system for processing.

SUMMARY

In accordance with some embodiments of the present disclosure, a photo-detecting circuit is provided which comprises: a photosensitive detector configured to accumulate photo-generated charges at a first node upon irradiation by light; a transfer circuit configured to establish a current path to the first node in response to a first scan signal being active, the photo-generated charges flowing through the current path to generate a photocurrent; an integrating circuit comprising a first input terminal connected to the first node via the transfer circuit, and a second input terminal configured to receive a reference voltage, the integrating circuit configured to selectively operate in a first mode in which the integrating circuit operates as an integrator to integrate the photocurrent and transfer an integration result to a second node for readout or a second mode in which the first input terminal of the integrating circuit is in conduction with the second node; and a reset circuit configured to selectively supply a first voltage or a second voltage to the second input terminal of the integrating circuit as the reference voltage, the first voltage being a DC voltage received at a reference voltage terminal, the second voltage being a result of an operation of both a) the DC voltage and b) a difference between the DC voltage and a voltage at the second node, the second voltage being greater than the first voltage.

In some embodiments, the reset circuit comprises: a subtractor configured to receive the DC voltage and the voltage at the second node, and output an operation result indicative of a difference between the DC voltage and the voltage at the second node; an adder configured to receive the DC voltage and the operation result of the subtractor, and output the second voltage; a first switch configured to selectively connect the reference voltage terminal to the second input terminal of the integrating circuit; a second switch configured to selectively transfer the voltage at the second node to the subtractor; and a third switch configured to selectively transfer the second voltage output by the adder to the second input terminal of the integrating circuit.

In some embodiments, the first switch comprises a first terminal connected to the reference voltage terminal and a second terminal connected to the second input terminal of the integrating circuit, the first switch configured to close in response to a second scan signal being active, and to open in response to the second scan signal being inactive. The second switch comprises a first terminal connected to the second node and a second terminal connected to the subtractor, the second switch configured to close in response to the second scan signal being inactive, and to open in response to the second scan signal being active. The third switch comprises a first terminal connected to the adder and a second terminal connected to the second input terminal of the integrating circuit, the third switch configured to close in response to the second scan signal being inactive, and to open in response to the second scan signal being active.

In some embodiments, the subtractor comprises: a first operational amplifier comprising a non-inverting input terminal, an inverting input terminal, and an output terminal; a first resistor connected between the inverting input terminal of the first operational amplifier and the second terminal of the second switch; a second resistor connected between the non-inverting input terminal of the first operational amplifier and the reference voltage terminal; a third resistor connected between the inverting input terminal and the output terminal of the first operational amplifier; and a fourth resistor connected between the non-inverting input terminal of the first operational amplifier and ground.

In some embodiments, the first and second resistors have a same resistance, and the third and fourth resistors have a same resistance.

In some embodiments, the first, second, third, and fourth resistors have a same resistance.

In some embodiments, the adder comprises: a second operational amplifier comprising a non-inverting input terminal, an inverting input terminal, and an output terminal; a fifth resistor connected between the output terminal of the first operational amplifier and the non-inverting input terminal of the second operational amplifier; a sixth resistor connected between the non-inverting input terminal of the second operational amplifier and ground; a seventh resistor connected between the reference voltage terminal and the non-inverting input terminal of the second operational amplifier; an eighth resistor connected between the ground and the inverting input terminal of the second operational amplifier; and a ninth resistor connected between the inverting input terminal and the output terminal of the second operational amplifier.

In some embodiments, the fifth, seventh and ninth resistors have a same resistance, and the eighth resistor has a resistance equal to the parallel resistance of the fifth resistor and the sixth resistor.

In some embodiments, the integrating circuit comprises: a third operational amplifier comprising an inverting input terminal as the first input terminal of the integrating circuit, a non-inverting input terminal as the second input terminal of the integrating circuit, and an output terminal; a capacitor connected between the inverting input terminal and the output terminal of the third operational amplifier; and a fourth switch connected between the inverting input terminal and the output terminal of the third operational amplifier. The fourth switch is configured to close in response to the second scan signal being inactive, and to open in response to the second scan signal being active.

In some embodiments, the integrating circuit further comprises: a tenth resistor connected between the output terminal of the third operational amplifier and the second node; and a fifth switch connected between the output terminal of the third operational amplifier and the second node. The fifth switch is configured to close in response to the second scan signal being inactive, and to open in response to the second scan signal being active.

In some embodiments, the transfer circuit comprises a transistor connected between the first node and the first input terminal of the integrating circuit. The transistor configured to turn on in response to the first scan signal being active, and to turn off in response to the first scan signal being inactive.

In some embodiments, the photosensitive detector comprises a photodiode.

According to some embodiments of the present disclosure, a flat panel detector is provided which comprises a plurality of photo-detecting circuits as described above, wherein the plurality of photo-detecting circuits are arranged in an array.

According to some embodiments of the present disclosure, a method of driving the photo-detecting circuit as described above is provided. The method comprises: accumulating, by the photosensitive detector, photo-generated charges at the first node upon irradiation by light; establishing, by the transfer circuit, the current path to the first node, the photo-generated charges flowing through the current path to generate the photocurrent; supplying, by the reset circuit, the first voltage to the second input terminal of the integrating circuit; integrating, by the integrating circuit, the photocurrent and transferring the integration result to the second node for readout; bringing the first input terminal of the integrating circuit into conduction with the second node; and supplying, by the reset circuit, the second voltage to the second input terminal of the integrating circuit.

BRIEF DESCRIPTION OF THE DRAWINGS

The drawings are used to provide a further understanding of the technical solutions of the present disclosure, and constitute a part of the specification. The drawings together with embodiments of the present application serve as illustration of, rather than limitation of, the technical solutions of the present disclosure.

DETAILED DESCRIPTION

It will be understood that, although the terms first, second, third etc. may be used herein to describe various elements or components, these elements or components should not be limited by these terms. These terms are only used to distinguish one element or component from another. Thus, a first element or component discussed below could be termed a second element or component without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", or "coupled to" another element or layer, it can be directly on, connected, or coupled to the other element or layer, or intervening elements or layers may be present. In contrast, when an element is referred to as being "directly on", "directly connected to" or "directly coupled to" another element or layer, there are no intervening elements or layers present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The inventors have found that in performing X-ray imaging with a flat panel detector, if the irradiation is too strong, the quantity of charges generated by the photodiode will be excessive such that the generated charge cannot be completely discharged during the reset phase. This causes interference in the reading of the quantity of charges next time, resulting in defects such as artifacts on the captured image.

Figure 1:
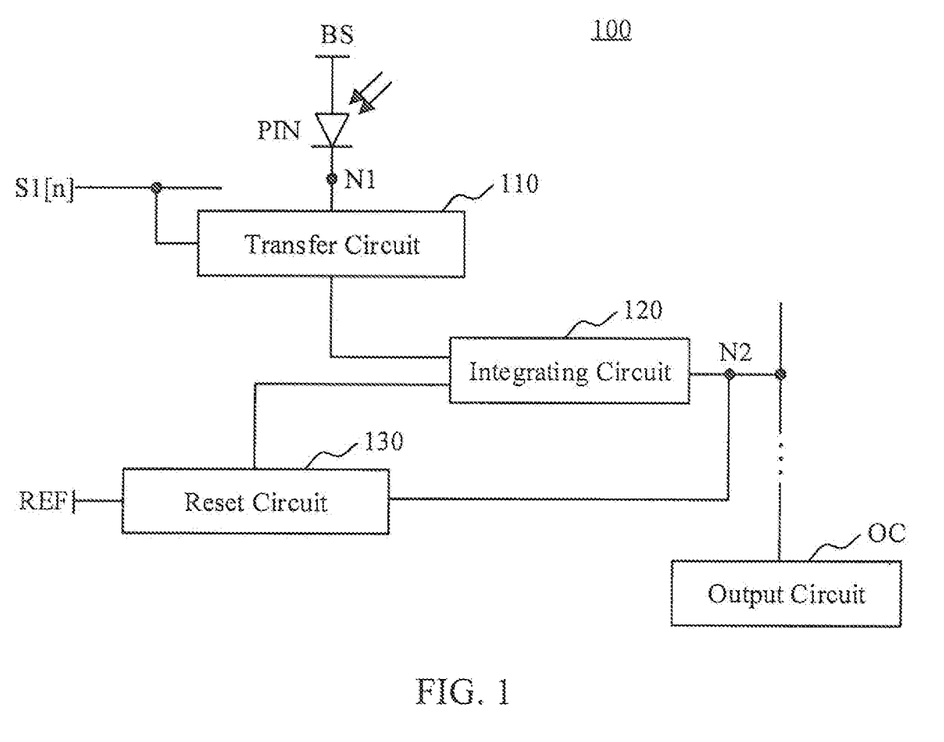
FIG. 1 is a schematic block diagram of a photo-detecting circuit in accordance with an embodiment of the present disclosure.

FIG. 1 is a schematic block diagram of a photo-detecting circuit 100 in accordance with an embodiment of the present disclosure. As shown in FIG. 1, the photo-detecting circuit 100 includes a photosensitive detector PIN, a transfer circuit 110, an integrating circuit 120, and a reset circuit 130.

The photosensitive detector PIN, such as a photodiode, is configured to accumulate photo-generated charges at a first node N1 upon irradiation by light. In this example, the anode of the photodiode PIN is connected to a bias voltage terminal BS such that the photodiode PIN operates in a reverse biased state. The cathode of the photodiode PIN is connected to the first node N1. In the reverse biased state, the photodiode PIN can generate a photocurrent flowing from the first node N1 to the bias voltage terminal BS when it is irradiated by light.

The transfer circuit 110 is configured to establish a current path to the first node N1 in response to a first scan signal S1[n] being active. The photocurrent can flow along the current path.

The integrating circuit 120 includes a first input terminal and a second input terminal. The first input terminal is connected to the first node N1 via the transfer circuit 110. The second input terminal is configured to receive a reference voltage. The integrating circuit 120 is configured to selectively operate in either a first mode or a second mode. In the first mode, the integrating circuit 120 operates as an integrator to integrate the photocurrent and transfer an integration result to a second node N2 for readout. In FIG. 1, an output circuit OC is shown for sampling and converting the integration result of the integrating circuit 120 for further processing. In the second mode, the integrating circuit 120 brings the first input terminal into conduction with the second node N2. In the second mode, the integrating circuit 120 can be considered to be in a short circuit state in which it provides a direct path from the first input terminal to the second node N2.

The reset circuit 130 is configured to selectively supply a first voltage V1 or a second voltage V2 to the second input terminal of the integrating circuit 120 as the reference voltage. The first voltage V1 is a DC voltage Vref received at a reference voltage terminal REF. The second voltage V2 is a result of an operation of both a) the DC voltage Vref and b) a difference between the DC voltage Vref and a voltage Vn2 at the second node N2.

In embodiments, the second voltage V2 is greater than the first voltage V1. As will be described later, this will speed up the discharge of the photo-generated charges from the first node N1, thereby accelerating the reset of the voltage at the first node N1. This would be advantageous for an accurate reading of the quantity of charges next time, thereby improving the quality of the captured image.

Figure 2:
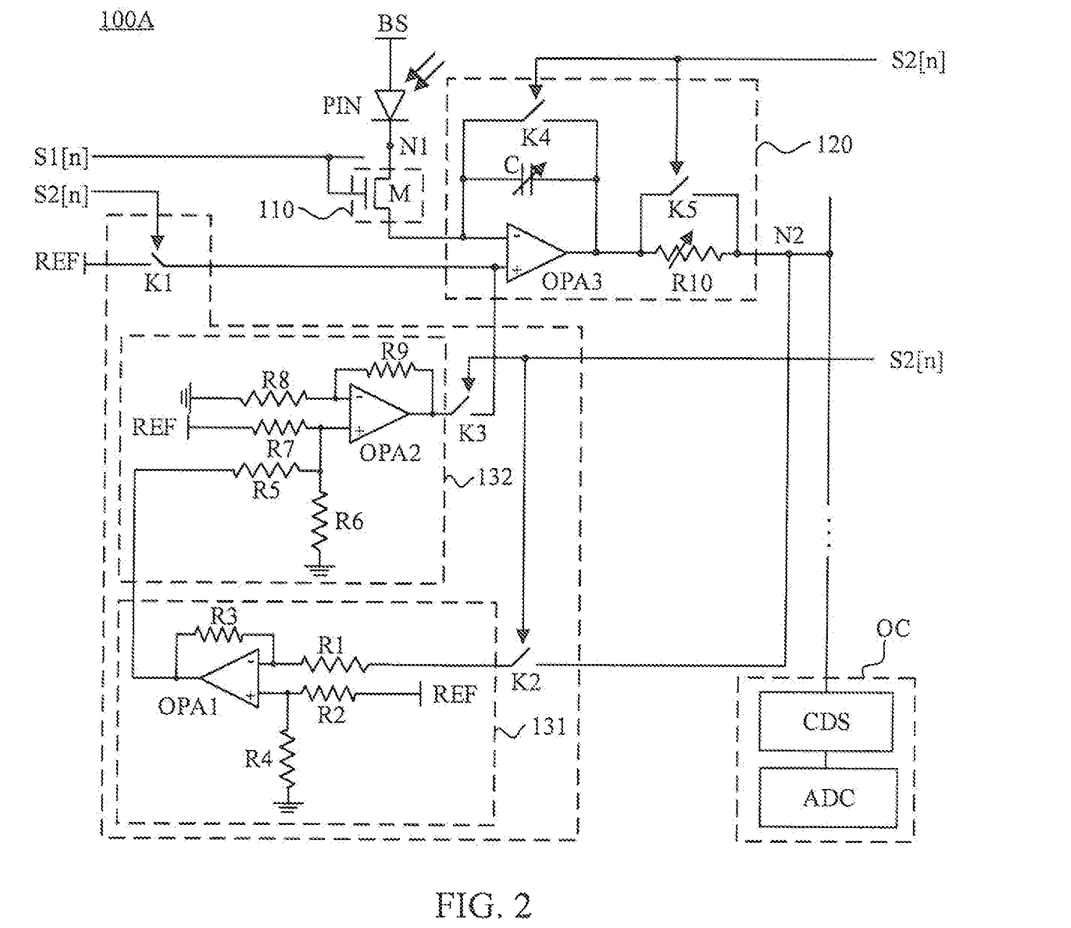
FIG. 2 is a schematic circuit diagram showing an example circuit of the photo-detecting circuit of FIG. 1.

FIG. 2 is a schematic circuit diagram showing an example circuit 100A of the photo-detecting circuit 100 of FIG. 1.

The transfer circuit 110 includes a transistor M connected between the first node N1 and the first input terminal of the integrating circuit 120. The transistor M is configured to be turned on in response to the first scan signal S1[n] being active, and turned off in response to the first scan signal S1[n] being inactive. In this embodiment, the transistor M is shown as an N-type transistor. In the case of an N-type transistor, the phrase "signal being active" means that the signal has a high level. In other embodiments, the transistor M may alternatively be a P-type transistor. In the case of a P-type transistor, the phrase "signal being active" means that the signal has a low level.

The integrating circuit 120 includes a third operational amplifier OPA3, a capacitor C, and a fourth switch K4.

The third operational amplifier OPA3 includes an inverting input terminal "−" as the first input terminal of the integrating circuit 120, a non-inverting input terminal "+" as the second input terminal of the integrating circuit 120, and an output terminal.

The capacitor C is connected between the inverting input terminal "−" and the output terminal of the third operational amplifier OPA3. The capacitor C is shown as a variable capacitor in FIG. 2, although this is not necessary.

The fourth switch K4 is connected between the inverting input terminal "−" and the output terminal of the third operational amplifier OPA3. The fourth switch K4 may be embodied as a transistor or any other suitable switch element. The fourth switch K4 is configured to close in response to a second scan signal S2[n] being inactive, and to open in response to the second scan signal S2[n] being active. More specifically, in the first mode of the integrating circuit 120 (in which it operates as an integrator), the fourth switch K4 opens such that the inverting input terminal "−" of the third operational amplifier OPA3 is connected to the output terminal of the third operational amplifier OPA3 via the capacitor C. In the second mode of the integrating circuit 120 (in which it operates as a direct path), the fourth switch K4 closes such that the third operational amplifier OPA3 is short-circuited.

The integrating circuit 120 may also optionally include a tenth resistor R10 and a fifth switch K5.

The tenth resistor R10 is connected between the output terminal of the third operational amplifier OPA3 and the second node N2. The tenth resistor R10 is shown in FIG. 2 as a variable resistor, although this is not necessary.

The fifth switch K5 is connected in parallel with the tenth resistor R10, namely, connected between the output terminal of the third operational amplifier OPA3 and the second node N2. The fifth switch K5 may be embodied as a transistor or any other suitable switch element. The fifth switch K5 is configured to close in response to the second scan signal S2[n] being inactive, and to open in response to the second scan signal S2[n] being active. More specifically, in the first mode of the integrating circuit 120 (in which it operates as an integrator), the fifth switch K5 opens such that the output terminal of the third operational amplifier OPA3 is connected to the second node N2 via the tenth resistor R10. The tenth resistor R10 has an appropriate resistance such that it acts as a filter for filtering out high frequency glitch generated, for example, due to an overly long signal line, thereby improving the quality of the signal to the output circuit OC. In the second mode of the integrating circuit 120 (in which it operates as a direct path), the fifth switch K5 closes such that the tenth resistor R10 is short-circuited.

The reset circuit 130 includes a subtractor 131, an adder 132, a first switch K1, a second switch K2, and a third switch K3.

The subtractor 131 is configured to receive the DC voltage Vref from the reference voltage terminal REF and the voltage Vn2 from the second node N2, and output an operation result indicative of a difference between the voltages Vref and Vn2. In the example of FIG. 2, the subtractor 131 includes a first operational amplifier OPA1, a first resistor R1, a second resistor R2, a third resistor R3, and a fourth resistor R4. The first operational amplifier OPA1 includes a non-inverting input terminal "+", an inverting input terminal "−", and an output terminal. The first resistor R1 is connected between the inverting input terminal "−" of the first operational amplifier OPA1 and the second switch K2. The second resistor R2 is connected between the non-inverting input terminal "+" of the first operational amplifier OPA1 and the reference voltage terminal REF. The third resistor R3 is connected between the inverting input terminal "−" and the output terminal of the first operational amplifier OPA1. The fourth resistor R4 is connected between the non-inverting input terminal "+" of the first operational amplifier OPA1 and the ground.

An output voltage Vo1 of the first operational amplifier OPA1 indicates a difference between the DC voltage Vref and the voltage Vn2 at the second node N2. The voltage Vo1 does not need to be exactly equal to Vref-Vn2.

Specifically, in an embodiment where the first and second resistors R1 and R2 have the same resistance and the third and fourth resistors R3 and R4 have the same resistance, the output voltage Vo1 of the first operational amplifier OPA1 can be expressed as:

$$Vo1 = \frac{R4}{R1}(Vref - Vn2)$$

Further, in an embodiment where the first, second, third, and fourth resistors R1, R2, R3, and R4 have the same resistance, the output voltage Vo1 of the first operational amplifier OPA1 can be expressed as:

$$Vo1 = (Vref - Vn2) \quad (1)$$

In other embodiments, the first to fourth resistors R1 to R4 may have resistances different from those described above.

The adder 132 is configured to receive the DC voltage Vref from the reference voltage terminal REF and the operation result from the subtractor 131, and output the second voltage V2. In the example of FIG. 2, the adder 132 includes a second operational amplifier OPA2, a fifth resistor R5, a sixth resistor R6, a seventh resistor R7, an eighth resistor R8, and a ninth resistor R9. The second operational amplifier OPA2 includes a non-inverting input terminal "+", an inverting input terminal "−", and an output terminal. The fifth resistor R5 is connected between the output terminal of the first operational amplifier OPA1 and the non-inverting input terminal of the second operational amplifier OPA2. The sixth resistor R6 is connected between the non-inverting input terminal "+" of the second operational amplifier OPA2 and the ground. The seventh resistor R7 is connected between the reference voltage terminal REF and the non-inverting input terminal "+" of the second operational amplifier OPA2. The eighth resistor R8 is connected between the ground and the inverting input terminal "−" of the second operational amplifier OPA2. A ninth resistor R9 is connected between the inverting input terminal "−" and the output terminal of the second operational amplifier OPA2.

An output voltage Vo2 of the second operational amplifier OPA2, i.e., the second voltage V2, is a result of an operation of the DC voltage Vref and the output voltage Vo1 of the second operational amplifier OPA2.

Specifically, in an embodiment where the fifth, seventh, and ninth resistors R5, R7, and R9 have the same resistance, the output voltage Vo2 of the second operational amplifier OPA2 can be expressed as:

$$Vo2 = \frac{R6(R5+R8)}{R8(2R6+R5)}(Vref + Vo2)$$

Further, in an embodiment where the eighth resistor has a resistance equal to the parallel resistance of the fifth resistor R5 and the sixth resistor R6, the voltage Vo2 can be expressed as:

$$V2 = (Vref + Vo1) \quad (2)$$

In other embodiments, the fifth to ninth resistors R5 to R9 may have resistances different from those described above.

The first switch K1 is configured to selectively connect the reference voltage terminal REF to the second input terminal of the integrating circuit 120. As shown in FIG. 2, the first switch K1 includes a first terminal connected to the reference voltage terminal REF and a second terminal connected to the second input terminal of the integrating circuit 120. The first switch closes in response to the second scan signal S2[n] being active, and opens in response to the second scan signal S2[n] being inactive. The first switch K1 may be embodied as a transistor or any other suitable switch element.

The second switch K2 is configured to selectively transfer the voltage Vn2 at the second node N2 to the subtractor 131. As shown in FIG. 2, the second switch K2 includes a first terminal connected to the second node N2 and a second terminal connected to the subtractor 131. The second switch K2 closes in response to the second scan signal S2[n] being inactive, and opens in response to the second scan signal S2[n] being active. The second switch K2 may be embodied as a transistor or any other suitable switch element.

The third switch K3 is configured to selectively transfer the second voltage V2 output by the adder 132 to the second input terminal of the integrating circuit 120. The third switch K3 includes a first terminal connected to the adder 132 and a second terminal connected to the second input terminal of the integrating circuit 120. The third switch K3 closes in response to the second scan signal S2[n] being inactive, and opens in response to the second scan signal S2[n] being active. The third switch K3 may be embodied as a transistor or any other suitable switch element.

FIG. 2 further shows schematically and exemplarily an output circuit OC including a correlated double sampling circuit CDS and a digital-to-analog converter ADC for sampling and converting the voltage Vn2 at the second node N2 for further processing.

Figure 3:
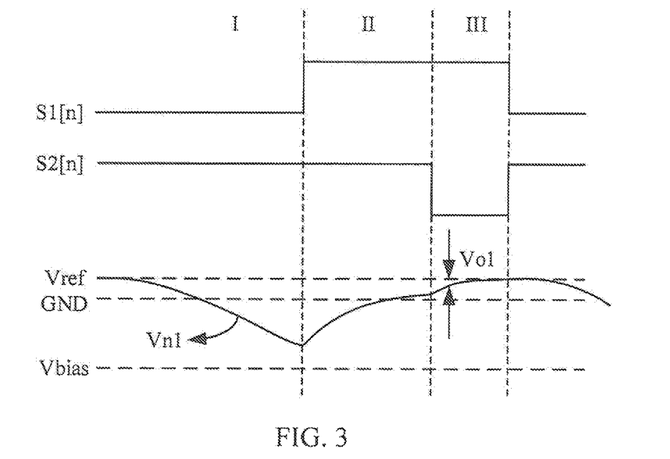
FIG. 3 is a timing diagram of the example circuit of FIG. 2.

FIG. 3 is a timing diagram of the photo-detecting circuit 100A of FIG. 2. FIG. 3 shows a time sequence of the first scan signal S1[n] and the second scan signal S2[n] in three phases I, II and III, and further shows a graph of the voltage Vn1 at the first node N1 as a function of time. The operation of the photo-detecting circuit 100A will be described below with reference to FIGS. 2 and 3.

In phase I (sense phase), the first scan signal S1[n] is inactive and the second scan signal S2[n] is active. The transistor M is turned off, the first switch K1 closes, and the second to fifth switches K2 to K5 open. The photodiode PIN is irradiated by light, and photo-generated charges are accumulated at the first node N1. As shown in FIG. 3, the voltage Vn1 at the first node N1 is initially equal to the reference voltage Vref (e.g., +1 V) at the reference voltage terminal REF, and gradually approaches toward a bias voltage Vbias (e.g., −6 V) at the bias voltage terminal BS as the photo-generated charge is accumulated. The voltage Vn1 can indicate the intensity of the light sensed.

In phase II (detect phase), both the first scan signal S1[n] and the second scan signal S2[n] are active. The transfer circuit 110 establishes a current path to the first node N1. Specifically, the transistor M becomes conductive, the first switch K1 remains closed, and the second to fifth switches K2 to K5 remains open. In this phase, the reset circuit 130 supplies the reference voltage Vref from the reference voltage terminal REF to the second input terminal of the integrating circuit 120, and the integrating circuit 120 operates in the first mode as an integrator which integrates the photocurrent generated by the photodiode PIN. As shown in FIG. 3, the voltage Vn1 of the first node N1 gradually approaches the reference voltage Vref. The integration result of the integrating circuit 120 is provided at the second node N2, and is sampled and converted by the output circuit OC. This way, the intensity of the light sensed by the photo-detecting circuit 100A is acquired, and can be used, for example, to form an image.

In phase III (reset phase), the first scan signal S1[n] is still active and the second scan signal S2[n] becomes inactive. The transistor M remains turned on, the first switch K1 becomes open, and the second to fifth switches K2 to K5 become closed. The integrating circuit 120 is short-circuited such that the first input terminal of the integrating circuit 120 is brought into conduction with the second node N2. Therefore, the voltage Vn1 at the first node N1 is directly supplied to the second node N2. The non-inverting input terminal "+" of the third operational amplifier OPA3 is no longer supplied with the reference voltage Vref from the reference voltage terminal REF, but is instead supplied with the second voltage V2 output by the reset circuit 130.

According to the above equations (1) and (2), the second voltage V2 may be equal to (Vref+Vo1) and Vo1 may be equal to (Vref−Vn2). Since the voltage Vn1 at the first node N1 is directly transferred to the second node N2 in this phase, namely, Vn2=Vn1, Vo1 is equal to (Vref−Vn1). Thus, the second voltage V2 can be expressed as:

$$V2=(Vref+Vo1)=Vref+(Vref-Vn1) \quad (3)$$

As can be seen from equation (3), the second voltage V2 is raised by Vo1 (Vref−Vn1) compared to the reference voltage Vref. Since the second voltage V2 is supplied to the non-inverting input terminal "+" of the third operational amplifier OPA3, the voltage at the inverting input terminal "−" of the third operational amplifier OPA3 will also be raised by Vo1 (=Vref−Vn1) due to the "virtual short circuit" effect of the operational amplifier. In this case, assuming that the voltage at the second node N2 is constant, the voltage difference between the inverting input terminal "−" of the third operational amplifier OPA3 and the second node N2 is increased, so that the charges at the first node N1 are discharged faster. Therefore, the voltage Vn1 at the first node N1 approaches the reference voltage Vref faster in the reset phase III, thereby speeding up the reset of the photodiode PIN.

Thereafter, the first scan signal S1[n] becomes inactive, and the second scan signal S2[n] becomes active. The photo-detecting circuit 100A enters the next photosensitive phase, and repeats the operation in phase I described above.

It will be understood that the photo-detecting circuit 100 described above with respect to FIGS. 1 to 3 may be used in a flat panel detector for X-ray imaging, or alternatively in any other suitable applications, such as fingerprint identification.

Figure 4:
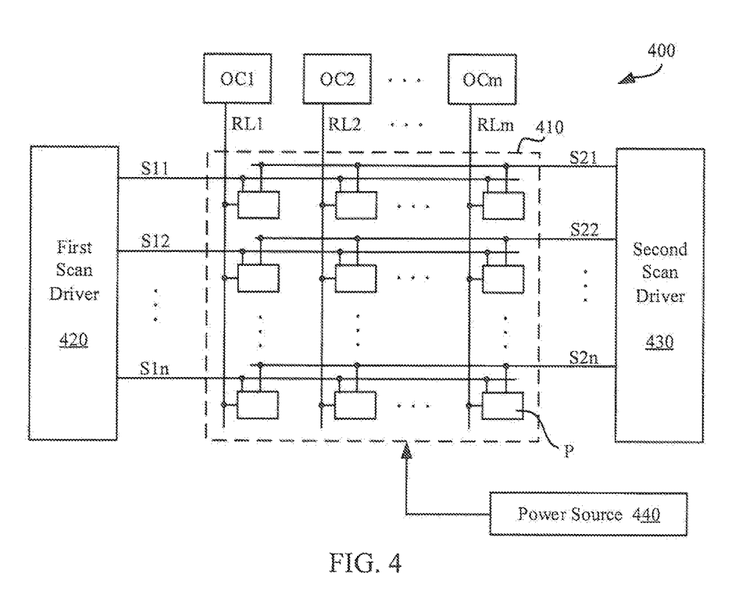
FIG. 4 is a schematic block diagram of a flat panel detector in accordance with an embodiment of the present disclosure.

FIG. 4 is a schematic block diagram of a flat panel detector 400 in accordance with an embodiment of the present disclosure. As shown in FIG. 4, the flat panel detector 400 includes a plurality of first scan lines S11, S12, . . . , S1n, a plurality of second scan lines S21, S22, . . . , S2n, a plurality of signal readout lines RL1, RL2 . . . , RLm, and a pixel array 410. The flat panel detector 400 further optionally includes a first scan driver 420, a second scan driver 430, a plurality of output circuits OC1, OC2, . . . , OCm, and a power source 440.

The pixel array 410 includes a plurality of pixels P arranged in an array, each of which may take the form of the photo-detecting circuit 100 described above with respect to FIGS. 1 to 3.

The first scan driver 420 is connected to the first scan lines S11, S12, . . . , Sin to sequentially supply respective first scan signals to respective rows of pixels in the pixel array 410.

The second scan driver 430 is connected to the second scan lines S21, S22, . . . , S2n to sequentially supply respective second scan signals to respective rows of pixels in the pixel array 410.

The output circuits OC1, OC2, . . . , OCm are connected to the signal readout lines RL1, RL2 . . . RLm, respectively, to sample and convert signals on the signal readout lines RL1, RL2, . . . , RLm during the detect phase.

The power source 440 supplies operating voltages such as the reference voltage Vref and the bias voltage Vbias to the pixels P in the pixel array 410.

The flat panel detector 400 can be applied to various image pickup devices. It will be understood that in X-ray imaging applications, the flat panel detector 400 may further include a scintillation crystal coating (not shown) that converts X-rays into visible light.

The flat panel detector 400 has the same advantages as those described above with respect to the photo-detecting circuit embodiments, which will not be repeated here.

The embodiments disclosed in the present disclosure should be considered as illustrative and exemplary, and not restrictive. Modifications and variations of the disclosed embodiments can be made by those skilled in the art to which the disclosure pertains without departing from the scope of the present disclosure. The protection scope of the present disclosure is defined by the appended claims. Although the method steps are recited in the claims in a specific order, this should not be construed as requiring that the steps must be performed in the specific order recited or in a sequential order.

What is claimed is:

1. A photo-detecting circuit, comprising:
   a photosensitive detector configured to accumulate photo-generated charges at a first node upon irradiation by light;
   a transfer circuit configured to establish a current path to the first node in response to a first scan signal being active, wherein the photo-generated charges flow through the current path to generate a photocurrent;
   an integrating circuit comprising a first input terminal connected to the first node via the transfer circuit, and a second input terminal configured to receive a reference voltage, the integrating circuit configured to selectively operate in a first mode in which the integrating circuit operates as an integrator to integrate the photocurrent and transfer an integration result to a second node for readout or operate in a second mode in which the first input terminal of the integrating circuit is in conduction with the second node; and
   a reset circuit configured to selectively supply a first voltage or a second voltage to the second input terminal of the integrating circuit as the reference voltage,
   wherein the first voltage is a DC voltage received at a reference voltage terminal,
   wherein the second voltage is a result of an operation based on both the DC voltage and a difference between the DC voltage and a voltage at the second node, and
   wherein the second voltage is greater than the first voltage.

2. The photo-detecting circuit of claim 1, wherein the reset circuit comprises:
   a subtractor configured to receive the DC voltage and the voltage at the second node, and output an operation result indicative of the difference between the DC voltage and the voltage at the second node;
   an adder configured to receive the DC voltage and the operation result of the subtractor, and output the second voltage;
   a first switch configured to selectively connect the reference voltage terminal to the second input terminal of the integrating circuit;
   a second switch configured to selectively transfer the voltage at the second node to the subtractor; and
   a third switch configured to selectively transfer a second voltage output from the adder to the second input terminal of the integrating circuit.

3. The photo-detecting circuit of claim 1,
   wherein a first switch comprises a first terminal of the first switch connected to the reference voltage terminal and a second terminal of the first switch connected to the second input terminal of the integrating circuit, the first switch configured to close in response to a second scan signal being active, and to open in response to the second scan signal being inactive,
   wherein a second switch comprises a first terminal of the second switch connected to the second node and a second terminal of the second switch connected to a subtractor, the second switch configured to close in response to the second scan signal being inactive, and to open in response to the second scan signal being active, and wherein a third switch comprises a first terminal of the third switch connected to an adder and a second terminal of the third switch connected to the second input terminal of the integrating circuit, the third switch configured to close in response to the second scan signal being inactive, and to open in response to the second scan signal being active.

4. The photo-detecting circuit of claim 3, wherein the subtractor comprises:
   a first operational amplifier comprising a non-inverting input terminal, an inverting input terminal, and an output terminal;
   a first resistor connected between the inverting input terminal of the first operational amplifier and the second terminal of the second switch;
   a second resistor connected between the non-inverting input terminal of the first operational amplifier and the reference voltage terminal;
   a third resistor connected between the inverting input terminal and the output terminal of the first operational amplifier; and
   a fourth resistor connected between the non-inverting input terminal of the first operational amplifier and ground.

5. The photo-detecting circuit of claim 4, wherein the first and second resistors have a same first resistance, and the third and fourth resistors have a same second resistance.

6. The photo-detecting circuit of claim 4, wherein the first, second, third, and fourth resistors have a same resistance.

7. The photo-detecting circuit of claim 3, wherein the adder comprises:
   a second operational amplifier comprising a non-inverting input terminal, an inverting input terminal, and an output terminal;
   a fifth resistor connected between the output terminal of a first operational amplifier and the non-inverting input terminal of the second operational amplifier;
   a sixth resistor connected between the non-inverting input terminal of the second operational amplifier and ground;
   a seventh resistor connected between the reference voltage terminal and the non-inverting input terminal of the second operational amplifier;
   an eighth resistor connected between the ground and the inverting input terminal of the second operational amplifier; and
   a ninth resistor connected between the inverting input terminal and the output terminal of the second operational amplifier.

8. The photo-detecting circuit of claim 7, wherein
   the fifth, seventh and ninth resistors have a same third resistance, and
   the eighth resistor has a fourth resistance equal to a parallel resistance of the fifth resistor and the sixth resistor.

9. The photo-detecting circuit of claim 1, wherein the integrating circuit comprises:
   a third operational amplifier comprising an inverting input terminal as the first input terminal of the integrating circuit, a non-inverting input terminal as the second input terminal of the integrating circuit, and an output terminal;
   a capacitor connected between the inverting input terminal and the output terminal of the third operational amplifier; and
   a fourth switch connected between the inverting input terminal and the output terminal of the third operational amplifier,
   wherein the fourth switch is configured to close in response to a second scan signal being inactive, and to open in response to the second scan signal being active.

10. The photo-detecting circuit of claim 9, wherein the integrating circuit further comprises:
    a tenth resistor connected between the output terminal of the third operational amplifier and the second node; and
    a fifth switch connected between the output terminal of the third operational amplifier and the second node,
    wherein the fifth switch is configured to close in response to the second scan signal being inactive, and to open in response to the second scan signal being active.

11. The photo-detecting circuit of claim 1,
    wherein the transfer circuit comprises a transistor connected between the first node and the first input terminal of the integrating circuit,
    wherein the transistor is configured to turn on in response to the first scan signal being active, and to turn off in response to the first scan signal being inactive.

12. The photo-detecting circuit of claim 1, wherein the photosensitive detector comprises a photodiode.

13. A flat panel detector comprising a plurality of photo-detecting circuits comprising the photo-detecting circuit as recited in claim 1, wherein the plurality of photo-detecting circuits are arranged in an array.

14. The flat panel detector of claim 13, wherein the reset circuit comprises:
    a subtractor configured to receive the DC voltage and the voltage at the second node, and output an operation result indicative of the difference between the DC voltage and the voltage at the second node;
    an adder configured to receive the DC voltage and the operation result of the subtractor, and output the second voltage;
    a first switch configured to selectively connect the reference voltage terminal to the second input terminal of the integrating circuit;
    a second switch configured to selectively transfer the voltage at the second node to the subtractor; and
    a third switch configured to selectively transfer a second voltage output from the adder to the second input terminal of the integrating circuit.

15. The flat panel detector of claim 13,
    wherein a first switch comprises a first terminal connected to the reference voltage terminal and a second terminal connected to the second input terminal of the integrating circuit,
    wherein the first switch configured to close in response to a second scan signal being active, and to open in response to the second scan signal being inactive,
    wherein a second switch comprises a first terminal connected to the second node and a second terminal connected to a subtractor,
    wherein the second switch configured to close in response to the second scan signal being inactive, and to open in response to the second scan signal being active,
    wherein a third switch comprises a first terminal connected to an adder and a second terminal connected to the second input terminal of the integrating circuit, and wherein the third switch configured to close in response to the second scan signal being inactive, and to open in response to the second scan signal being active.

16. The flat panel detector of claim 15, wherein the subtractor comprises:
a first operational amplifier comprising a non-inverting input terminal, an inverting input terminal, and an output terminal;
a first resistor connected between the inverting input terminal of the first operational amplifier and the second terminal of the second switch;
a second resistor connected between the non-inverting input terminal of the first operational amplifier and the reference voltage terminal;
a third resistor connected between the inverting input terminal and the output terminal of the first operational amplifier; and
a fourth resistor connected between the non-inverting input terminal of the first operational amplifier and ground.

17. The flat panel detector of claim 15, wherein the adder comprises:
a second operational amplifier comprising a non-inverting input terminal, an inverting input terminal, and an output terminal;
a fifth resistor connected between the output terminal of a first operational amplifier and the non-inverting input terminal of the second operational amplifier;
a sixth resistor connected between the non-inverting input terminal of the second operational amplifier and ground;
a seventh resistor connected between the reference voltage terminal and the non-inverting input terminal of the second operational amplifier;
an eighth resistor connected between the ground and the inverting input terminal of the second operational amplifier; and
a ninth resistor connected between the inverting input terminal and the output terminal of the second operational amplifier.

18. The flat panel detector of claim 13, wherein the integrating circuit comprises:
a third operational amplifier comprising an inverting input terminal as the first input terminal of the integrating circuit, a non-inverting input terminal as the second input terminal of the integrating circuit, and an output terminal;
a capacitor connected between the inverting input terminal and the output terminal of the third operational amplifier; and
a fourth switch connected between the inverting input terminal and the output terminal of the third operational amplifier,
wherein the fourth switch is configured to close in response to a second scan signal being inactive, and to open in response to the second scan signal being active.

19. The flat panel detector of claim 18, wherein the integrating circuit further comprises:
a tenth resistor connected between the output terminal of the third operational amplifier and the second node; and
a fifth switch connected between the output terminal of the third operational amplifier and the second node, the fifth switch configured to close in response to the second scan signal being inactive, and to open in response to the second scan signal being active.

20. A method of driving a photo-detecting circuit, wherein the photo-detecting circuit comprises a photosensitive detector configured to accumulate photo-generated charges at a first node upon irradiation by light, a transfer circuit configured to establish a current path to the first node in response to a first scan signal being active, wherein the photo-generated charges are configured to flow through the current path to generate a photocurrent, wherein the photo-detecting circuit further comprises an integrating circuit comprising a first input terminal connected to the first node via the transfer circuit, and a second input terminal configured to receive a reference voltage, wherein the integrating circuit is configured to selectively operate in a first mode in which the integrating circuit operates as an integrator to integrate the photocurrent and transfer an integration result to a second node for readout or a second mode in which the first input terminal of the integrating circuit is in conduction with the second node, wherein the photo-detecting circuit further comprises a reset circuit configured to selectively supply a first voltage or a second voltage to the second input terminal of the integrating circuit as the reference voltage, wherein the first voltage comprises a DC voltage received at a reference voltage terminal, wherein the second voltage comprises a result of an operation based on both the DC voltage and a difference between the DC voltage and a voltage at the second node, wherein the second voltage is greater than the first voltage, the method comprising:
accumulating, by the photosensitive detector, photo-generated charges at the first node upon irradiation by light;
establishing, by the transfer circuit, the current path to the first node, the photo-generated charges flowing through the current path to generate the photocurrent;
supplying, by the reset circuit, the first voltage to the second input terminal of the integrating circuit;
integrating, by the integrating circuit, the photocurrent and transferring the integration result to the second node for readout;
bringing the first input terminal of the integrating circuit into conduction with the second node; and
supplying, by the reset circuit, the second voltage to the second input terminal of the integrating circuit.

* * * * *